United States Patent

Hsu et al.

[11] Patent Number: 5,982,898
[45] Date of Patent: Nov. 9, 1999

[54] CERTIFICATION PROCESS

[75] Inventors: Yung-Kao Hsu, Aberdeen; Stephen Seymour, Bound Brook, both of N.J.

[73] Assignee: AT&T Corp., New York, N.Y.

[21] Appl. No.: 08/812,640

[22] Filed: Mar. 7, 1997

[51] Int. Cl.[6] .................................................. H04L 9/00
[52] U.S. Cl. ................................. 380/23; 380/25; 380/49
[58] Field of Search ................................ 380/25, 23, 49, 380/24

[56] References Cited

U.S. PATENT DOCUMENTS

| | | | |
|---|---|---|---|
| 5,005,200 | 4/1991 | Fischer | 380/30 |
| 5,224,163 | 6/1993 | Gasser et al. | 380/30 |
| 5,261,002 | 11/1993 | Perlman et al. | 380/130 |
| 5,455,953 | 10/1995 | Russell | 380/23 X |
| 5,604,804 | 2/1997 | Micali | 380/25 |
| 5,659,616 | 8/1997 | Sudia | 380/23 |
| 5,745,574 | 4/1998 | Muftic | 380/23 |

OTHER PUBLICATIONS

Taher Elgamal, Jeff Treuhaft, Frank Chen, "Securing Communications on the Intranet and Over the Internet", Netscape Communications Corp., Jul. 1996.

Purser M., "Cosine Sub–Project PB: Security Services", Computer Networks and ISDN Systems, vol. 25, No. 40/05, Nov. 1, 1992.

*Primary Examiner*—Pinchus M. Laufer

[57] ABSTRACT

An improved secure communication arrangement separates the tasks of identity verification and certificate issuing, which allows a disassociating of the long-term binding between Alice and her public/private key pair. This is accomplished by a registration authority issuing a password to Alice once it is satisfied of Alice's bona fide. Thereafter, whenever Alice wishes to communicate with Bob, she contacts a certification authority, identifies herself with the password and obtains a private key and a corresponding short-lived certificate. The certificate typically includes Alice's name and a public key in plaintext, and a signature. The signature is derived by hashing the plaintext portion of the certificate to obtain a value, and encrypting the value with the CA's private key. She then contacts Bob, submits her certificate, Bob performs the same hashing function to obtain a value, decrypts the signature with CA's public key to obtain a decrypted value, and compares the value Bob created with the decrypted value. If the two match, Bob is assured that the person submitting the certificate may be communicated with by using the public key included in the certificate.

37 Claims, 3 Drawing Sheets

FIG. 3

| SERIAL NO. | 101 |
|---|---|
| DATE | 03/01/97-18:00 |
| NAME | ALICE JONES |
| ATTRIBUTE | MEMBER OF TEAM XY12 |
| KEY | ser!23V*990)qdvi3=%JKwq493 |
| USES | 3 |
| CA | |
| CA KEY | |
| SERVICE | LIBARY ACCESS |
| AUTHORIZATION CODE | 523 |
| PURPOSE | ACCESS DATABASES(NO MODIFICATIONS) |
| SIGNATURE | ro9els&<2ksLQ+1@P[[sjd2Jd |

CERTIFICATION PROCESS

BACKGROUND OF THE INVENTION

This invention relates to certifications used in connection with secure and authorized communications.

In some applications, a user who wishes to obtain goods or services from a provider is asked to authorize a charge against the user's credit card number. In such applications, the security concern lies most heavily on the user, who worries about the security of the transmitted information. In other applications, a user may seek to obtain proprietary information from the provider, and there the security concern lies most heavily on the provider. In the latter situation, however, the provider is also concerned about the identity of the user.

With respect to securing communication, it is well known that secret keys may be used to encrypt information, but that requires both parties to have a secret key. Consequently, a party that communicates with many people needs to have many different secret keys. The effort to securely distribute and manage many secret keys was considered just too great, until public key encryption was invented. In public key encryption, a party, say Alice, develops a pair of keys: one is private (which the party keeps secret) and one is public (which the party makes available to others). Unless her secret key is compromised, no one but Alice can encrypt a message that can be decrypted with Alice's public key, and no one but Alice can decrypt a message that was encrypted with Alice's public key. Thus, public key encryption eliminates the need to securely exchange secret keys and also eliminates the need to have and to manage many secret keys.

Public key encryption, however, does not eliminate concerns about the identity of the party supplying the public key. The reason: anyone can claim to be Alice. To remedy this problem, the notion of certification was created whereby Bob can demand a certificate which confirms that the party is who it claims to be. To obtain a certificate, Alice authenticates herself to a certification authority (CA) in some manner that satisfies the CA. For example, the CA may require Alice to show her driver's license, an original birth certificate, or even more. Alice is then given (or creates) a public key encryption pair, and is given a certificate that is derived by the CA from information that binds the certificate to Alice. The information may comprise, for example, Alice's name, some information that further identifies Alice, and her public key. When Alice wishes to contact Bob, she submits her certificate and Bob decrypts it with CA's public key. The decrypted certificate identifies Alice and Alice's public key, and Bob is assured that a person named Alice owns a private key that corresponds to the public key which the decrypted certificate provided.

This certification approach still has a problem, however, in that while Alice was certified by the CA at one point, she may no longer be certified, in the sense of still being authorized to receive the information that Bob may have. To that end, the certification process is augmented, requiring Bob to check Alice's certification against a revocation list. This list is accessed by downloading a revocation list at some regular intervals from a revocation list storage means.

A number of problems remain, however, with the certification approach, and which relate to the fact that the certificates are long-lived and there is a private key that is associated with the certificate. For one, it introduces a burden on the mobility of users because it requires users to carry with them their private key. Of course, that represents a security risk. Another problem is that the longevity of a certificate provides an incentive to discover, or break, the private key that is associated with the public key found in the certificate. To reduce the risk to the private key, users typically increase the length of their keys, but that increases the computational burden of the applications that encrypt or decrypt the communicated information. A third problem relates to the cost of managing and administering the valid and revoked certificates for large scale intranet environments.

SUMMARY

The certification overhead problems are greatly ameliorated by separating the tasks of identity verification and certificate issuing, which allows a disassociating of the long-term binding between Alice and her public/private key pair. This is accomplished by a registration authority issuing a password to Alice once it is satisfied of Alice's bona fide. Thereafter, whenever Alice wishes to communicate with Bob, she contacts a certification authority, identifies herself with the password and obtains a private key and a corresponding certificate. The certificate typically includes Alice's name and a public key in plaintext, and a signature. The signature is derived by hashing the plaintext portion of the certificate to obtain a value, and encrypting the value with the CA's private key. She then contacts Bob, submits her certificate, Bob performs the same hashing function to obtain a value, decrypts the signature with CA's public key to obtain a decrypted value, and compares the value Bob created with the decrypted value. If the two match, Bob is assured that the person submitting the certificate may be communicated with by using the public key included in the certificate.

In accordance with these principles, the certificate that is issued to Alice is short-lived, perhaps valid only for a few hours. Such short-lived certificates remove the need for a revocation list, and remove the incentive for an interloper to discover Alice's private key.

BRIEF DESCRIPTION OF THE DRAWING

FIG. 3 illustrates a certificate issued by a CA on a particular day.

DETAILED DESCRIPTION

In light of the increasing ubiquity of Internet and Intranet transactions and the awareness that these mediums are fairly insecure, the information technology industry is seeking solutions to the security concerns of users, and the current thrust is to use public key cryptography-based technologies such as the ITU X.509 Digital Certificate, and Secured Socket Layer protocol. Both Netscape and Microsoft, for example, use this technology to support secured sessions between a client and a server.

Figure 1:
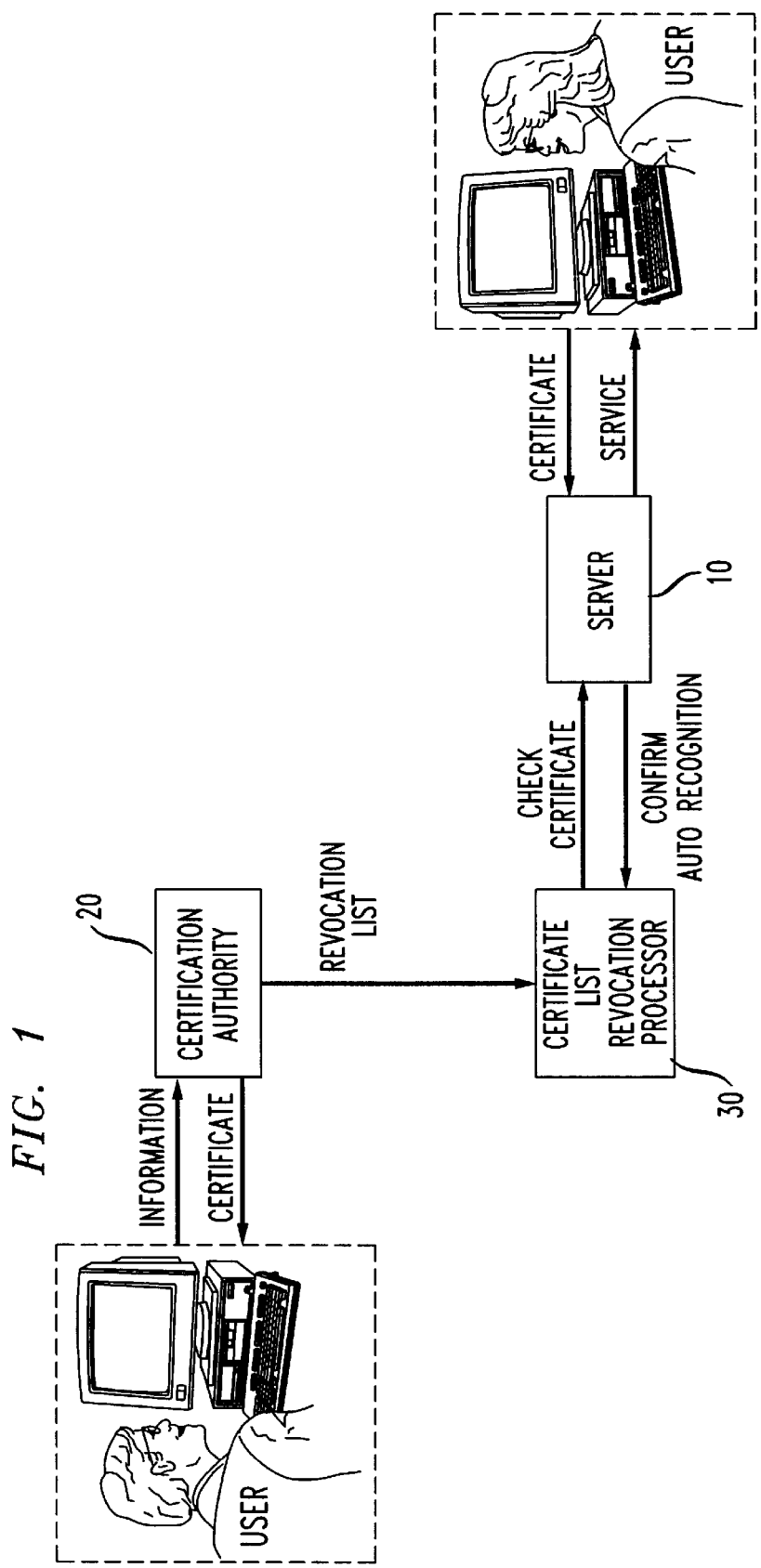
FIG. 1 is a diagram of a prior art certification process.

FIG. 1 presents one embodiment of a prior art certification process, describing a process whereby Alice obtains a certificate for herself, and whereby Bill employs his certificate to communicate with an application that resides on application server 10. To obtain a certificate, Alice communicates with a certification authority (CA) 20 in a secure manner. The certification authority may be a designated department of Alice's employer, it may be a trusted commercial concern (e.g., the provider of telecommunication services). The secure method of communication may be the Secured Socket Layer protocol, or it may be an "in person" interaction. During this secure communication, Alice provides CA 20 with whatever information the CA requires and when Alice meets the CA's criteria, CA 20 provides Alice with a certificate which includes a date of issue, a public key, a signature, and a private key that corresponds to the public key pair. The signature is derived by passing the other information through a hashing function and encrypting the resulting value with the private key of the certification authority.

The certificate is typically long-lived—on the order of months—because its primary purpose is to vouch for Alice. More specifically, its purpose is to vouch for the fact that secure communication can be sent to Alice by encrypting information with the public key included in the certificate. The certification is not permanent because, to maintain a high level of confidence in the security of communication, it is desirable to change from time to time Alice's public/private key pair. In addition to the natural expiration of the certificate, there needs to be a means for revoking a certificate when, for example, Alice's private key is compromised. Once such means are included, it can also be viewed as a means to revoke a certificate for reasons other than a compromise of the private key, such as when company X no longer wishes Alice to have the capability to access company X resources.

Thus, the FIG. 1 arrangement includes a revocation list processor 30 which stores certificates that are no longer valid. Since more and more certificates become invalid with time, the number of certificates stored by processor 30 could continually increase, unless a bound is effected. Such a bound dovetails with the notion that certificates expire naturally after some long but finite life (as indicated above, typically a month or more; e.g., 1, 2, 6, 24 months). This allows processor 30 to discard from its memory those certificates that were previously revoked and are now naturally expired.

When Bill wishes to access an application on application server 10 (e.g., via the Internet), he submits to server 10 a certificate which he previously received from CA 20. Application 10 hashes the plaintext portion of the received certificate to obtain a value, and also decrypts the signature portion of the received certificate with CA 20's public key. If the value obtained from the hashing function corresponds to the value obtained from the decryption process, then application 10 concludes that the certification is valid; that is, that the person who is named in the certificate is the person who has a private key that corresponds to the public key which is included in the certificate.

It should be easily appreciated that the efforts of creating certificates, maintaining a list of revoked certificates, and engaging in the communication associated with confirming certificates present key management problems. The problem also extends to the protection of private keys, user mobility, and general operation and administration.

It is believed that the root cause of many of the key management problems can be traced to the long-lived nature of the certificates. When a certificate is long-lived, the possibility of it becoming invalid increases with time due to unforeseeable and/or uncontrollable events, such as compromise of the employee's private key, the employee leaving the company or leaving the project that requires access authorization, etc. Long-lived certificates are also more likely to be compromised because they are almost certainly going to be stored on the hard drive of a user's computer and, sometimes, access to the computer is open. Moreover, there is more incentive for an interloper to expend the effort to compromise the private key.

Figure 2:
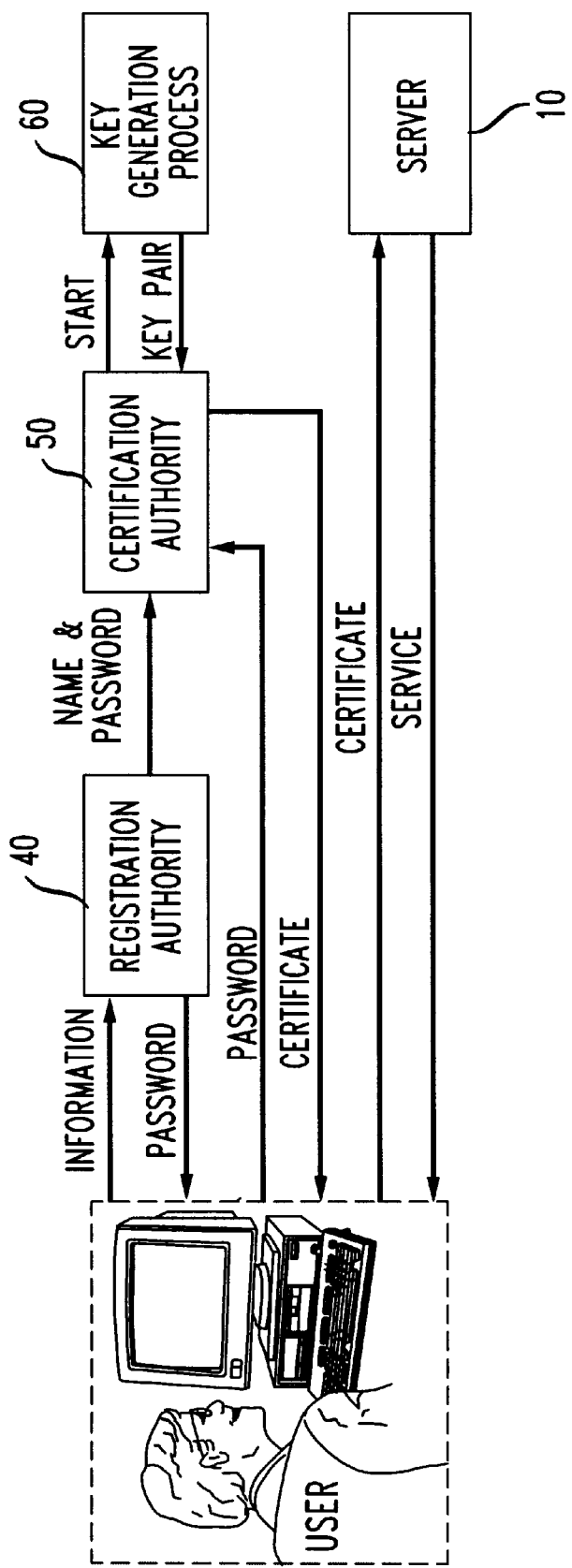
FIG. 2 is a diagram of a certification process in accordance with the principles disclosed herein.

FIG. 2 presents one embodiment of an improved process which eliminates the need for application server 10 to contact a revocation list processor, and which finely controls the authorization aspect of certificates.

A word about the authorization aspect of certificates. Including Alice's name in the certificate is a form of an authorization check, in the sense that information is provided to application server 10 to definitively identify the party that is accessing the application server. However, there is no cryptographical reason to include Alice's name in the certificate. Indeed, situations often arise where an application server is not really interested in knowing who the party is but only in some attribute of the party (such as, "is the party credit worthy?"). A classic example is when a person uses a credit card and the merchant is merely interested in getting paid. On the other side of the ledger, however, there are instances where knowing the certificate is valid is insufficient. The fact that the person named in the certificate, such as Bill, can be sent information in a secured manner does not necessarily dispose of the question whether application server 10 should in fact grant Bill access.

In the prior art, the authorization issue is addressed in the CA, at least in part. That is, by granting a certificate the CA authorizes at least some service-providing entities, such as application server 10, to proceed. However, there may be other application servers that do not wish to convey information or to provide a service unless Bill belongs to a particular class (e.g., an employee). Typically, the CA is in the best position to ascertain whether Bill should be authorized and, when that is the case, the granting of a certificate by the CA is conditioned on Bill presenting evidence to the CA that Bill belongs to the subject class. Alas, this introduces another time sensitivity to the certificate granted by the CA because while Bill may belong to the subject class when he requested a certificate, he may no longer belong to the subject class when he uses the certificate. That means that the reliance of prior art systems on the revocation list (30) is higher.

In contradistinction to the prior art, in the FIG. 2 arrangement the authorization issue can be shared between the CA and the application server, as appropriate, and there is no reliance on a revocation list whatsoever.

In accordance with the FIG. 2 arrangement, Alice is accepted into "the fold" through a contact with registration authority (RA) 40 over a secured channel. During this contact Alice submits whatever proofs and information RA 40 requires to satisfy itself of Alice's bona fide, and once RA 40 is satisfied, it provides Alice with a public key of certification agent (CA) 50, and it issues Alice a password. RA 40 then informs CA 50 of Alice's password and authorization information, either over a secured channel or by encrypting the information with CA 50's public key.

Thereafter, whenever Alice needs a certificate, she contacts CA 50, identifies herself with the password (or a hardware token that increases the level of security), and perhaps submits to CA 50 some other information, such as the purpose(s) to which Alice wishes to apply the certificate. To protect Alice's password, the communication from Alice can be over a secured channel, or it can be encrypted with CA 50's public key. Once CA 50 has the request, it can determine whether the password is valid. If so, CA 50 proceeds to ascertain whether the purpose for which the certificate is requested is an authorized purpose. If it is not, the certificate is refused. Otherwise, CA 50 obtains a public/ private key pair (e.g., process 60) for Alice, and proceeds to construct a certificate. Illustratively, the certificate comprises an expiration time, Alice's public key, Alice's name, Alice's private key, the purpose for which the certificate was requested or some other authorization code, the name of the certification authority, a serial number (so that the CA can keep track of what certificates it issued and to whom), and a signature. The signature is obtained, as in the prior art, by hashing the plaintext information in the certificate to obtain a value and encrypting that value with the private key of CA 50.

Significantly, as stated above, the FIG. 2 arrangement does not require an application server to download or to otherwise access or consult a revocation list. Rather, the certificate provides all of the information that an application server 10 needs to determine that a) the certificate is valid, and b) use of the certificate is still authorized. In accordance with the principles disclosed herein this is achieved, at least in part, by having certificates that are short-lived. That is, the expiration time of certificates created by the FIG. 2 arrangement is less than one month, and typically much less than one month. In fact, the typical certificate created by the FIG. 2 arrangement may be good for only one day and perhaps for even less than one day. For example, the expiration time of the certificate may include merely a date, a date with an implicit time (e.g., the end of a business day), or it may include a date and an explicit time (e.g., Mar. 18, 1997-16:00).

In a further improvement which generically tightens authorizations, a certificate created by the FIG. 2 arrangement may include a "number of uses" limitation. The number of uses limitation may be explicit, by including a number in the certificate, or it may be implicit. For example, the FIG. 2 arrangement may be set so that each certificate is honored by any application server 3 times, or a certificate is honored by one application server 10 times, and by another application server only once.

The fields that correspond to the expiration time and the number of uses are but two of the mechanisms to control access. A third mechanism for controlling access is embodied in the information regarding the purpose for which the certificate was requested, or the purpose for which the certificate is issued (the two may be synonymous, but not necessarily so). The fact that CA 50 grants a certificate and includes information that allows an application server to decide whether to provide access effectively transfers some authorization control from CA 50 to the application servers to which the certificates are offered. This may be advisable because CA 50 may not have its authorization profiles up to date, or for other reasons it is not advisable to keep all authorization data centrally. Of course, there are some clear advantages to keeping at least some authorization control centrally in CA 50. First, at least some authorization information is more likely to be known to CA 50; second, centralization of such information is a more efficient way to maintain control over the myriad application servers that an enterprise might have; and third, centralization reduces the risk of information being compromised. Further, when a request for a certificate (for a particular purpose) does not pass muster under the authorization information available in CA 50, the grant of a certificate is simply refused.

For the certificate described above, which includes Alice's private key, the communication of the certificate from CA 50 to Alice must be over a secured channel. This requirement, however, may be dispensed with, and Alice may be offered an additional measure of security by allowing Alice to generate her own key pair. In such an arrangement, Alice creates a public/private key pair, provides CA 50 with her public key in addition to the other required information, and CA 50 responds with a certificate. No private key information is communicated.

Stripped to the minimum, the goals of a certificate communicated by CA 50 to Alice are satisfied by merely associating a public key with a private key that Alice has, by including information which indicates that the certificate is not stale or expired, and by providing a mechanism to assure the recipient of a certificate that CA 50 vouches for whatever information is communicated by the certificate to the application server. This mechanism is a "stamping" of the certificate's information with the private key of CA. The stamping can be effected by collecting the information of the certificate, encrypting the collected information with the private key of CA 50, and presenting the encrypted result as the certificate. Alternatively, the stamping can be effected with a signature created in accordance with the above-described prior art techniques.

The stamping by means of a signature is more compact than the encryption of the entire set of information that is contained in the certificate, but an even more shorter transmission from CA 50 to Alice is achieved by simply not including some of the information that Alice already has. For example, Alice already knows her name, her public key, and the purpose for which she wishes to use the certificate (as she communicated that purpose to CA 50). Alice may even know that the certificate she gets will be valid only for the current day only (e.g., the certification will expire at the "end of business" of the day the certificate was requested). In such a case, CA 50 might dispense with sending the unnecessary information and rather send only the information that Alice does not have, such as the signature, perhaps an authorization code, and the like (e.g., the public key of application server 10—which is really not part of the certificate). Effectively, CA 50 limits itself to sending only the certificate core, allowing Alice to construct the rest of the certificate. Of course, whatever Alice appends to the certificate core must be known to CA 50 or must have been communicated to CA 50 for inclusion in the information that is "stamped."

One additional piece of information that is included in the above-described certificate and which might not be needed is the identity of the certification authority. If that is known and understood by whatever application servers are accessed by Alice, the certificate need not include that data. This, of course, can be a variable which depends on the information provided by Alice to CA 50. For example, when Alice wants to communicate with a server that belongs to her employer, the certificate will not include the CA's identity. When Alice wishes to communicate with, say, the U.S. Patent and Trademark Office (PTO), the certificate will include the CA's identity.

With a certificate at hand, Alice contacts application server 10 (e.g., via the Internet) and submits her certificate to the server. Server 10 verifies the certificate with the public key of CA 50 and, if appropriate (based on the information contained in the certificate), concludes that communication with Alice can proceed, determines the level of service that it will provide to Alice, and knows that it needs to respond to Alice by using Alice's public key for encryption (while Alice may use the public key of application server 10). Since public key encryption is computationally more intensive than a symmetric secret key, the first and perhaps the only communication that server 10 might engage in by using Alice's public key is a transmission of a secret key to Alice. Since only Alice has the appropriate private key that corresponds to the public key, only Alice can decrypt and thereby utilize the secret key provided by application server 10. Subsequent session communications between Alice and server 10 can then take place using the secret key. While the same secret key could be used in later sessions between Alice and application server 10, there is a clear security advantage in using a different secret key with each session.

To summarize, the arrangements of FIG. 1 and FIG. 2 contemplate using secure communications between users such as Alice and Authorities 20 and 40, and insecure communications between the users and application server 10 (and also CA 50). What the FIG. 2 arrangement saves is the need for a revocation list and the need for server 10 to communicate with a revocation list processor 30. Correspondingly, the certificate created for the FIG. 2 arrangement differs in character from the prior art certificates obtained for the FIG. 1 arrangement. If the latter is likened to a driver's license because it is long-lived, then the former can be likened to a subway token or to a bus ticket because it is short-lived. Also, the certificate created for the FIG. 2 arrangement is more like an authorization to an application server than a confirmation of a party's identity.

The advantages accruing from the FIG. 2 arrangement can be appreciated by sketching out a typical arrangement. In such an arrangement, Alice is an employee of company X and is stationed at location x1. Company X has many other locations and many other employees. At one of its locations, company X maintains (for security and efficiency reasons as discussed above) an overall database of its employees and processing capabilities to implement the registration authority. Company X would most likely have a single registration authority because the communication burden on the registration authority is fairly light. When Alice needs a password, which is chosen to be relatively long-lived (e.g., significantly more than one week), she contacts the registration authority in a secure manner, as discussed above. Since such communication occurs relatively infrequently (only when Alice is first qualified and thereafter only when a new password is needed), the burden on Alice and on the infrastructure of communication into RA 40 is not great.

In contrast to the single RA 40, company X may have a certification authority 50 in each of its locations. Each of the CA 50s is supplied with information from RA 40 whenever a new password is issued to an employee that a particular CA 50 is charged with servicing, or when new authorizations take effect. This communication is either over a secured channel or is encrypted with the public key of CA 50, and it, too, is infrequent.

When Alice wishes to obtain a certificate, she contacts her local CA 50. Again, this contact must use a secure channel of communication or be encrypted with the public key of CA 50. When the desired certificate is for contacting an application server of company X, the certificate need not identify the CA, since that is understood.

Having obtained a certificate, Alice can access any resource of company X throughout its far flung reaches and can securely communicate over a relatively insecure medium such as Internet. These resources, which may be a single computer that contains information or performs computations, or whole networks of computers that, perhaps, control operations for company X, belong to company X and it is a simple matter to have them installed with knowledge of the public key of company X. Each application that is accessed by Alice on such a remote resource needs only to execute a module that decrypts a certificate and monitors a "hand shaking" protocol with Alice (such as sending Alice a secret key and receiving a confirmatory response from Alice). No communication by this module with the "outside world" needs to take place and that, of course, is a significant advantage.

Alice might be restricted to only some of the resources that belong to company X, and the restrictions may be based on Alice's status. For example, because Alice is an employee of company X she may be entitled to access information in the company's library; by virtue of being on the team of project Y, Alice may be permitted to access files in a certain server; and by virtue of being the administrator of the company's payroll computer, Alice may be permitted to "bring down" the computer for maintenance. Clearly, in accordance with the principles disclosed herein, Alice can obtain a number of certificates, and each certificate specifies the particular authorization that is granted. Alternatively, a single code might suffice. When application server 10 receives a certificate that includes a number of uses limitation, it accesses a count of the number of times the certificate had been used, increments the count, and when the count exceeds the maximum number for which the certificate is good, service is refused.

Of course, this approach can also be used in connection with a resource that is owned by other than company X. For example, a company such as AT&T can provide its public key to another entity, say U.S. PTO, and provide a certificate to each of its intellectual property attorneys. The PTO can then receive applications, amendments, etc. over the Internet with assurance that the attorney does operate on behalf of AT&T. Illustratively, a certificate that precedes an electronic filing of a patent application with the PTO is shown in FIG. 3.

The notion of a transfer that is common in subway tokens can also be implemented in the FIG. 2 certificates. For example, a particular server 10 may decide to "hand off" Alice to another server. It can issue its own certificate to vouch for Alice to that other server and offer Alice's certificate so that the other server would get Alice's public key.

We claim:

1. A method comprising the steps of:
    a certification authority interacting with a user to receive a password from the user;
    receiving a user password from said user;
    receiving and storing a password from a third party to form a stored password;
    determining whether said user password is valid by comparing said user password to said stored password;
    when said user password is concluded to be valid by said step of determining, developing a certificate core that comprises information that results from encryption of first data with a private key of the certification authority (CA-PrKey), which first data comprises a public key of the user and a short-lived expiration time of the certificate, and
    delivering the certificate core to the user to be used at least as part of the certificate.

2. The method of claim 1 where the expiration time is less than one month from the date the certificate is issued.

3. The method of claim 1 where the expiration time is the day after the day the certificate is issued.

4. The method of claim 1 where the expiration time explicitly includes the time of day.

5. The method of claim 1 further comprising the step of employing at least a part of the certificate core as a certificate or appending information to at least a part of the certificate core to form a certificate.

6. The method of claim 5 where a portion of the certificate core is not used as part of the certificate.

7. The method of claim 5 where the appending of information to form a certificate is carried out by the certification authority.

8. The method of claim 5 where the appending of information to form a certificate is carried out by the user.

9. The method of claim 1 where said first data also includes name of a user to whom the certificate is intended to be delivered.

10. The method of claim 1 where the first data also includes one or more from the set containing identity of the certification authority, name of a user to whom the certificate is intended to be delivered, other information about the user, a field that identifies the certificate to the certification authority, a service for which the certificate is valid, a purpose for which the certificate is valid, an authorization code, a server for which the certificate is intended, and a number of uses of the certificate in a server.

11. The method of claim 10 where a decision whether to include in said first data the identity of the certification authority is based on information provided by the user in the step of interacting.

12. The method of claim 1 where the first data further comprises information provided by the user, or information provided by the certification authority, or both.

13. The method of claim 1 where said encryption with CA-PrKey comprises encryption of a value which is derived from a hashing of the first data, and the certificate core further comprises second data which comprises the public key of the user and the short-lived expiration time of the certificate.

14. The method of claim 13 where the appending of information to form a certificate is carried out by the certification authority.

15. The method of claim 13 where the appending of information to form a certificate is carried out by the user.

16. The method of claim 13 where the second data further comprises one or more from a set comprising the name of the user, other information about the user, service for which the certificate is intended, service for which the certificate is valid, authorization code, expiration time of the certificate, or a number of uses of the certificate in a server.

17. The method of claim 16 where the information appended to the certificate core to form a certificate is included in the first data.

18. The method of claim 13 where the public key of the user is either provided by the user or by the certification authority.

19. The method of claim 13 where the second data further comprises information provided by the user, or information provided by the certification authority, or both.

20. The method of claim 13 where the information provided by the certification authority in the second data includes a public key that is associated with the private key of the user.

21. The method of claim 13 where the first data is identical to the second data.

22. The method of claim 1 further comprising the steps of:
said user providing specified information to a registration authority,
based on said specified information, said registration authority ascertaining whether said user deserves to possess said password, and
when said step of ascertaining concludes that said user deserves a password, said registration authority communicates said password to said certification authority.

23. The method of claim 22 where said registration authority creates said password.

24. The method of claim 22 where said password includes name of said user.

25. The method of claim 22 where in said step of said certification authority receiving said password from said user, said certification authority also receives name of said user, and where said registration authority communicates said user name to said certification authority when it communicates said password to said certification authority.

26. The method of claim 1 where said first data also includes name of a user to whom the certificate is intended to be delivered.

27. The method of claim 1 where said first data also includes a service for which the certificate is valid.

28. The method of claim 1 where said first data also includes a purpose for which the certificate is valid.

29. The method of claim 1 where said first data also includes a server for which the certificate is intended.

30. The method of claim 1 where said first data also includes a number of uses of the certificate in a server.

31. A method for responding to a connection request from a user comprising the steps of:
a certification authority receiving a password from a third party;
said user receiving a certificate from said certification authority in response to a user password presented to said certification authority by said user;
receiving said certificate, which contains information, including an expiration time;
determining the certificate's bona fide;
refusing to continue the connection either when the certificate is not bona fide or when the expiration time has passed; and
carrying on the connection with aid from a public key contained in the certificate, without reference to information regarding revocation of certificates, when the expiration time of the certificate has not yet arrived.

32. The method of claim 31 where the step of determining the certificate's bona fide comprises:
processing at least some plaintext information included in the certificate to obtain a value;
encrypting the value with a public key of a known certification authority to obtain a signature;
comparing the obtained signature with a signature contained in the certificate; and
accepting a first field of information contained in the certificate as a bona fide expiration time and a second field of information contained in the certificate as a bona fide user public key.

33. The method of claim 32 where the first field is either plaintext, encrypted with a private key of the certification authority that corresponds to the public key of the certification authority, or encrypted with a user private key that corresponds to the user public key.

34. The method of claim 32 where the second field is either plaintext or encrypted with a private key of the certification authority that corresponds to the public key of the certification authority.

35. The method of claim 31 where the step of determining the certificate's bona fide comprises:
obtaining a public key of a certification authority;
decrypting the certificate; and
accepting a first field of information contained in the certificate as a bona fide expiration time and a second field of information contained in the certificate as a bona fide user public key.

36. The method of claim 31 further comprising, prior to the step of refusing the connection, a step of determining from other information contained in the certificate, and without reference to information received by the processor with respect to the received certificate, whether the processor should respond to the connection request, where the step of refusing to continue the connection is executed when the step of determining concludes that communication should be refused.

37. The method of claim 31 where the information contained in the certificate which is utilized in the step of determining is a purpose for which the certificate is to be employed, a service for which the certificate is employed, an application server identity, or number of uses.

* * * * *